(No Model.)

G. W. CHURCH.
MICROMETER GAGE.

No. 278,094. Patented May 22, 1883.

WITNESSES:
John H. Deemer
C. Sedgwick

INVENTOR:
G. W. Church
BY Munn & Co
ATTORNEYS.

UNITED STATES PATENT OFFICE.

GEORGE W. CHURCH, OF ROSEVILLE, NEW JERSEY.

MICROMETER-GAGE.

SPECIFICATION forming part of Letters Patent No. 278,094, dated May 22, 1883.

Application filed February 17, 1883. (No model.)

*To all whom it may concern:*

Be it known that I, GEORGE W. CHURCH, of Roseville, in the county of Union and State of New Jersey, have invented a new and useful Improvement in Micrometer-Gages, of which the following is a full, clear, and exact description.

The object of my invention is to provide a micrometer-gage in which the measuring-bar may be forced against the object to be measured, always with a certain uniform pressure, thereby rendering the instrument more accurate than heretofore.

Reference is to be had to the accompanying drawings, forming part of this specification, in which similar letters of reference indicate corresponding parts in both figures.

Figure 1:
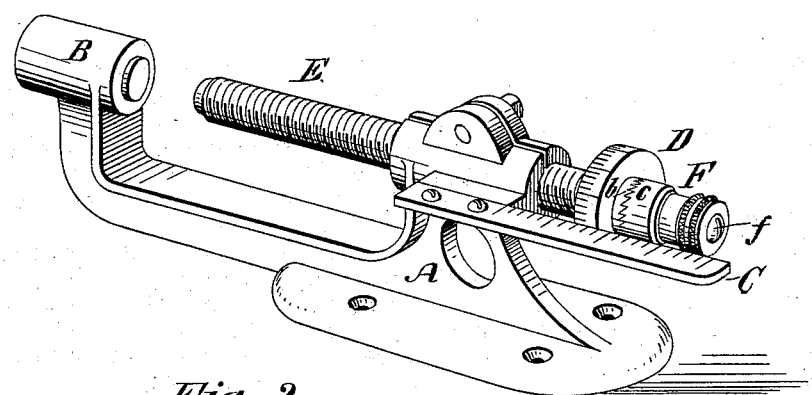
Figure 2:
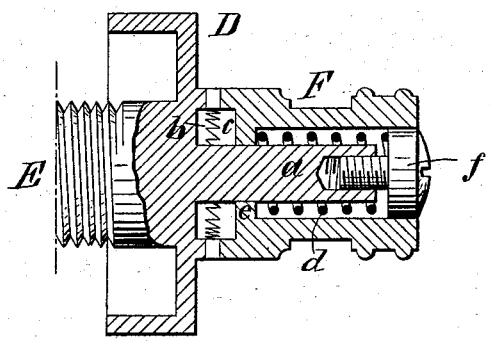

Figure 1 is a perspective view of a micrometer made in accordance with my invention; and Fig. 2 is a sectional view of the rear end of the measuring-bar, friction-knob, and circular scale.

The stand A, upright abutment B, horizontal scale C, circular scale D, and measuring-bar E are all of ordinary construction, except that the bar E is reduced at its rear end to form the spindle $a$, and that the circular scale D has the ratchet-teeth $b$ formed upon it. Upon the spindle $a$ is placed the turning knob F, the forward edge or end of which is notched to form the teeth $c$ to correspond with the teeth $b$, and this knob is chambered out or enlarged to receive the coiled-wire spring $d$, which bears at its inner end against the internal flange, $e$, of the knob and at its outer end against the head of the screw $f$, which is screwed into a screw-tap formed in the rear end of the spindle $a$, so that the action of the spring serves always to press the knob forward against the circular scale D, causing its teeth $c$ to engage with the teeth $b$ of the circular scale, as shown in the drawings. The slant of the teeth $c$ is toward the right, while that of the teeth $b$ is toward the left, and the screw-threads of the measuring-rod D are right-hand screw-threads, so that when turned forward by the knob F its movement depends upon the pressure of the spring $d$, which is always sufficient to turn the bar until its end reaches the object to be measured placed between it and the abutment B, whereupon the knob will turn independent of the bar E. In this manner the measuring-bar will come against the object to be measured always with an equal pressure, thus always insuring an accurate measurement without reference to the strength of the person using the device. The backward movement of the measuring-bar will be a positive movement, as will be understood from Fig. 1. Another advantage of the improvement is that there will be no danger of causing the end of the measuring-bar to be embedded in, so as to indent the object being measured.

The pressure of the spring $d$ may be regulated by turning the screw $f$ in or out, as circumstances require.

Having thus described my invention, what I claim as new, and desire to secure by Letters Patent, is—

1. The circular scale D, attached to the bar E, and having the teeth $b$, in combination with the knob F, spring $d$, and screw $f$, the knob having the teeth $c$, substantially as and for the purposes set forth.

2. The combination, with the screw-shank $a$, knob F, and spring $d$, of the tension-regulating screw $f$, substantially as shown and described.

GEORGE W. CHURCH.

Witnesses:
H. A. WEST,
C. SEDGWICK.